United States Patent [19]

Owen et al.

[11] Patent Number: 4,687,497
[45] Date of Patent: Aug. 18, 1987

[54] SOLIDS-GAS SEPARATOR

[75] Inventors: Hartley Owen, Belle Mead; James H. Haddad, Princeton Junction, both of N.J.

[73] Assignee: Mobil Oil Corporation, New York, N.Y.

[21] Appl. No.: 912,287

[22] Filed: Sep. 29, 1986

[51] Int. Cl.$^4$ .............................................. B01D 45/12
[52] U.S. Cl. .................................... 55/349; 422/147; 55/429
[58] Field of Search ......................... 55/345, 349, 429; 422/147; 208/164

[56] References Cited

U.S. PATENT DOCUMENTS

| | | | |
|---|---|---|---|
| 2,850,364 | 9/1958 | Dowling | 23/288 |
| 2,895,907 | 7/1959 | Crosby | 208/150 |
| 4,036,779 | 7/1977 | Schatz et al. | 252/417 |
| 4,317,798 | 3/1982 | Worley | 422/144 |
| 4,556,479 | 12/1985 | Mauleon et al. | 55/349 |

FOREIGN PATENT DOCUMENTS 1594696   7/1970   France .................... 55/349

Primary Examiner—Bernard Nozick
Attorney, Agent, or Firm—Alexander J. McKillop; Michael G. Gilman; L. G. Wise

[57] ABSTRACT

A catalyst recovery apparatus is provided for separating finely divided solid particles from a hot gas stream comprising a vertical metal shell having a lower hot gas inlet and an upper clean gas outlet, a plurality of thermally expandable metal cyclone assemblies supported at their top regions by a horizontal plate, each of the cyclone assemblies having a downwardly extending dipleg which exits into a centrally disposed solids collector, a vertically slidable particle collector outlet conduit which extends from the collector bottom downwardly through the enclosed shell, and a compressible seal means or packing gland arrangement disposed around the collector outlet conduit and comprising an annular packing holding member, a vertically movable packing compression member, and a compressible packing material.

12 Claims, 3 Drawing Figures

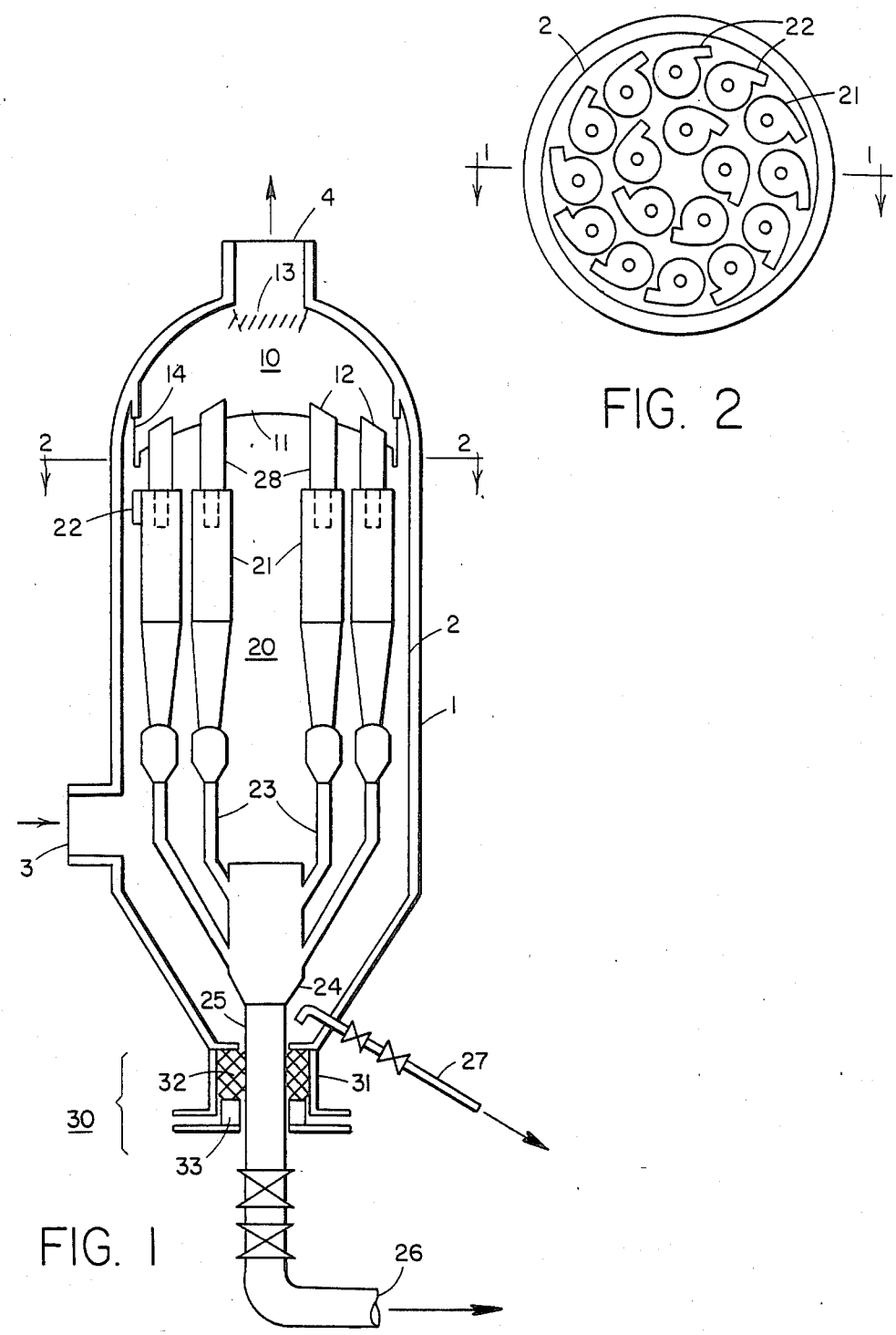

SOLIDS-GAS SEPARATOR

FIELD OF THE INVENTION

The invention relates to an apparatus for separating finely divided solid particles from a hot gas stream. In particular, it relates to an improved auxiliary or tertiary recovery unit for purifying a gas stream from a fluidized catalytic cracking (FCC) operation or the like.

BACKGROUND OF THE INVENTION

Catalyst entrained in the effluent from a thermal unit operation, such as fluidized catalytic cracking (FCC) of petroleum gas oil, may be recovered for re-use. Various separation units are known for separating solids from hot gases. Continuously operated fluidized bed systems often employ primary or secondary cyclones for the main separation operations; however, these units often permit a small, but significantly costly, amount of valuable catalyst to escape the system by entrainment in the effluent gas. For example, in continuous cyclic FCC systems, an oxidative regeneration step is required to remove coke deposits from zeolite particles, usually having a particle size range from 1 to 150 microns, typically 20 to 100 microns average size.

The regeneration usually involves high temperature burning of the carbonaceous deposits to generate a flue gas having a temperature of about 600° to 800° C. While the major amount of regenerated catalyst is readily recovered from the hot flue gas by primary and secondary cyclone devices, filters, etc., a minor amount of the fine particles, typically having a particle size less than 40 microns, is entrained in the flue gas.

In order to utilize the flue gas safely in downstream energy recovery units, such as turbines, etc., and to avoid expensive catalyst make-up requirements, it is desirable to recover the entrained solids more completely. Accordingly, an auxiliary or tertiary recovery unit can be employed for this purpose. Such a downstream separator must be able to withstand the erosion of high-velocity, particle-laden gases and the thermal expansion and contraction due to dynamic changes in the gas streams being cleaned.

Intermittent or cyclic changes in thermal conditions can occur during FCC process startup or upset conditions. Fluctuation in the flue gas temperature must be accommodated by the downstream separator and the materials of construction require adaptation to dimensional changes of the materials employed, usually base metals, such as carbon steel and refractory oxides.

It is an object of the present invention to prevent excessive damage to a recovery unit for solids-gas separation which is caused by differential thermal expansion between the various components when the unit is in operation. A technique has been found for operating a solids-gas separator under dynamic temperature conditions to permit differential expansion of internal components relative to the unit shell by providing a vertically slidable, adjustable sealing mechanism in the bottom outlet portion of the separator.

SUMMARY OF THE INVENTION

A solids-gas separator which can be employed as a tertiary recovery apparatus in a series of catalyst reclaiming zones of a fluidized catalytic conversion (FCC) unit has been designed. The separator comprises a plurality of transversely spaced-apart metal cyclone assemblies which are thermally expandable in a downward direction when hot solids-laden gas is directed into the cyclones via a lower gas stream inlet in a vertical vessel or shell. The shell also contains a top clean gas outlet for release of clean, particle-free gas.

In an effort to control the excessive mechanical stress on the elements of the separator caused by downward thermal expansion of the cyclone assemblies when inlet gas, at temperatures between 600° to 800° C., is drawn into the assemblies, a compressible seal means or packing gland structure is arranged in an annular fashion at the base of the separator. The packing gland structure forms an axially moving seal between an operatively connected downward extension of the cyclone assemblies; namely, a particle collector outlet conduit and the metal shell of the solids-gas separator. Such an axially movable arrangement provides for both an effective seal at the base of the separator and a dynamic or adjustable means for relieving the mechanical stress on the elements of the separator when the unit is in operation.

BRIEF DESCRIPTION OF THE DRAWINGS

FIG. 1 is a vertical cross-sectional view of an improved solids-gas separator according to the present invention, partially cut away to show internal structure;

FIG. 2 is a horizontal cross-sectional view of the separator along line 2—2 of FIG. 1.

DESCRIPTION OF THE PREFERRED EMBODIMENTS

Figure 3:
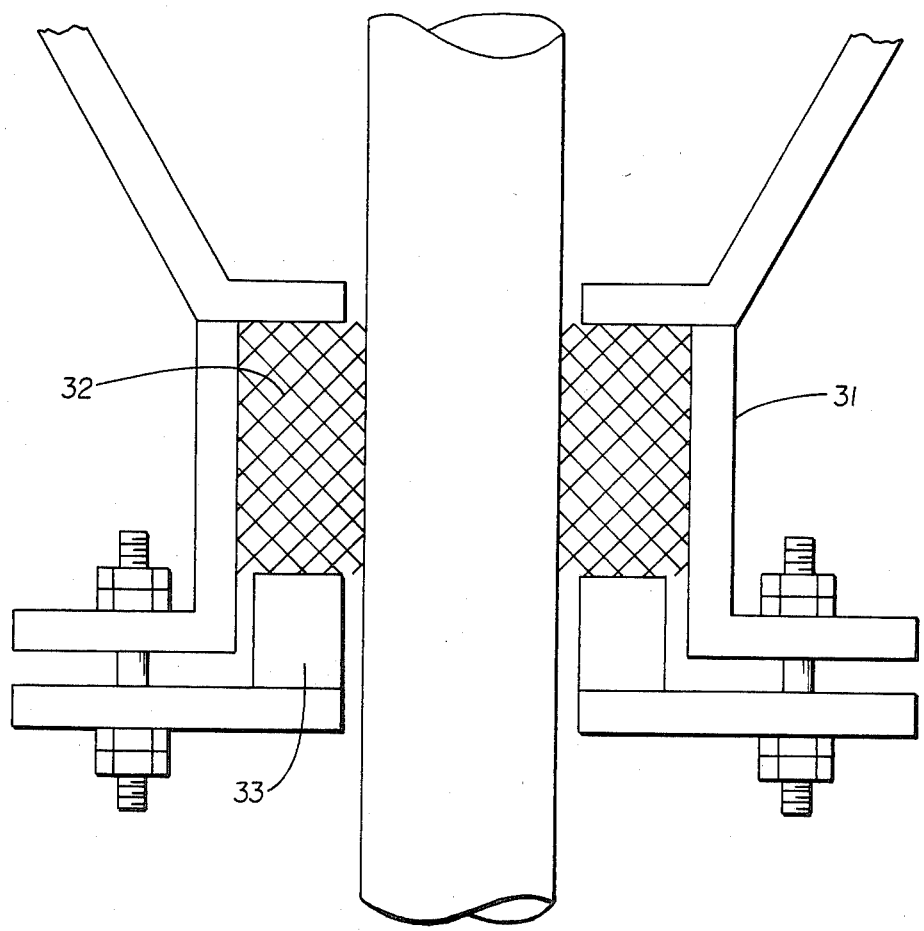
FIG. 3 is an enlarged view of a lower portion of FIG. 2 showing a compression assembly.

Referring to FIG. 1, a solids-gas separator 1 made of a metal such as carbon steel and having a refractory lining 2, which can be secured to the metal vessel by means of V-clips, receives a hot flue gas containing finely divided solid particles (in the range of 5 to 30μ average diameter) from an integrated fluidized catalytic cracking (FCC) unit comprising a cracking zone and a multi-stage catalyst regeneration zone. The particle-laden hot gas passes through lower gas stream inlet 3 in either a radial or tangential fashion and enters transversely spaced-apart metal cyclone assemblies 21, each having a peripheral gas inlet 22. The lower gas inlet means is disposed to introduce hot gas into the vertical metal vessel above a central solids collector 24 and below the peripheral gas inlets 22 of the cyclone assemblies.

Upon entering the cyclones 21 at tangential cyclone inlets 22 disposed to receive particle-laden hot gas from a lower gas receiving zone 20, the gas is stripped of a major amount of entrained particles by a whirling cyclonic action. Particles which are separated from the hot gas pass downwardly through the interior of the thermally expandable metal cyclone assemblies 21, which are either unlined or lined with abrasion and heat-resistant refractory material. From the plurality of cyclones 21, which are contained within the vessel and supported at a top portion thereof by a horizontal support plate means 11 for dividing the vessel into a lower hot gas receiving chamber 20 and an upper clean gas plenum chamber 10, the retained particles proceed downwardly through a series of elongated vertical solids-conveying tubes or dip-legs 23, which are operatively connected to the cyclone separation portion in downward extension. The horizontal plate means or diaphragm 11 is connected to the metal vessel or shell 1 by a cylindrically shaped support enclosure 14.

A centrally disposed solids-collector or dip-leg pot 24 is connected to the vertical solids-conveying tubes or dip-legs 23 in a radial pattern to receive separated solids from each of the cyclone assembly tubes. Extending from the central solids collector 24 is a vertically slidable collector outlet conduit 25 which carries separated particles from the collector 24 to the outside of the substantially cylindrical enclosed metal vessel 1 via fines outlet 26. Particles can be accumulated in a fines recovery zone (not shown).

During the recovery operation, the hot gas and particles cause a considerable thermal expansion of the cyclone assemblies 21 in a downward direction from the support plate 11. The enclosed metal vessel 1 does not undergo the similar extreme amount of thermal expansion simultaneously with the cyclones because the interior wall of vessel 1 is thermally insulated from the hot gas. To compensate for this differential thermal expansion, a compressible seal means or packing gland arrangement 30 is positioned in an annular fashion around the exterior of the collector outlet conduit 25 to form an axially moving seal between the conduit 25 and the metal vessel 1.

The packing gland arrangement 30 contains an annular packing holder member 31, a vertically movable packing compression member 33, and a solid temperature resistant compressible packing material 32. The annular packing holder member 31 provides a circumferential enclosure for the packing material 32, which can be of a fibrous nature; such as graphite or asbestos. The packing material 32 is vertically compressed, released or expanded by means of movable packing compression member 33. The compression member 33 can be adjusted while the separator is in operation so as to either compress or expand the packing material 32 in response to the amount of thermal expansion of the cyclone assemblies 21. Alternatively, the compression member 33 can be adjusted to an initial compression force prior to introduction of the particle-laden hot flue gas into the separator or tertiary recovery apparatus. The packing force should be sufficient to prevent undue leakage while permitting vertical slip without generating excessive distortion stresses in the cyclone assembly. A preferred method of adjusting the movable packing compression member 33 is by means of bolts which are uniformly distributed around the periphery of the flanges of the annular packing holder member 31 and the packing compression member 33. The bolts can be mechanically tightened to compress the fibrous packing, as depicted in FIG. 3.

The packing gland structure 30 permits a vertically sliding seal to be maintained between the vertically slidable collector outlet conduit 25, which is connected to the collector at a bottom portion thereof and extends downwardly through the enclosed vessel at a central point therein, and the annular packing holder member 31, which is attached to the bottom of the vertical shell 1.

The hot gas, which is now essentially free of particulate matter, passes upwardly through the upper cyclone support tube gas outlets 28, each outlet being attached to the upper end of a single cyclone assembly, and into a clean gas plenum chamber 10. The upper cyclone support tube gas outlets 28 are hung from the dome-shaped horizontal support plate 11. The support plate comprises an essentially circular concavo-convex diaphragm containing a symmetric array of access holes to accommodate the upper cyclone support tube gas outlets in stabilizing relationship.

The plurality of cyclones 21 are arranged in an essentially symmetrical radial pattern around the vertical axis of the solids-gas separator 1, as shown in FIG. 2, which is a horizontal cross-sectional view of the separator along line 2—2 of FIG. 1.

The clean gas in the plenum chamber 10 can still have an amount of small particles, which could include spalled refractory material, entrained therein. In an effort to prevent such particles from escaping into the outlet duct, the outlet of the plenum chamber 10 is fitted with a particle retainer or "grizzly" 13. The particle deflector 13 is located immediately below the top clean gas outlet and effectively serves to capture extraneous particulate material having particle sizes ranging from about 5 microns to about 4 mm. The hot gas is directed onto the "grizzly" 13 and through the top clean gas outlet 4. The deflected particles accumulate on the upper surface of member 11.

A secondary outlet conduit 27 is connected through the vessel adjacent the compressible seal means for removing solid particles accumulated at the bottom end of the substantially cylindrical vertical metal vessel. The secondary outlet or underflow conduit 27 acts in conjunction with the collector outlet conduit or main underflow tube 25 to relieve the burden of removing fine particles from the vertical metal vessel 1.

While the invention has been described by reference to certain embodiments, there is no intent to limit the inventive concept except as set forth in the following claims.

We claim:

1. A solids-gas separator for recovering fine solid particles entrained in a hot gas stream comprising:
   an enclosed refractory lined vertical metal vessel having a lower gas stream inlet and a top clean gas outlet;
   a plurality of thermally expandable metal cyclone assemblies contained within the vessel and supported at a top portion thereof by a horizontal support plate means for dividing the vessel into a lower hot gas receiving chamber and an upper clean gas plenum chamber;
   each of said cyclone assemblies having a peripheral gas inlet into a cyclonic separation portion, an upper cyclone gas vertical outlet and an elongated vertical solids-conveying tube extending downwardly from the cyclone separation portion for removing solid particles therefrom, said cyclone assemblies expanding downwardly from the support plate during heating;
   a central solids collector connected to receive separated solids from each of the cyclone assembly tubes;
   a vertically slidable collector outlet conduit connected to the collector at a bottom portion thereof and extending downwardly through the enclosed vessel at a central point therein;
   compressible seal means attached to the vessel by an annular packing holder member, a vertically movable packing compression member disposed around the collector outlet conduit in sliding relationship thereto, and a solid temperature resistant compressible packing material retained between the annular packing holder and the collector outlet conduit for effecting a vertically sliding seal.

2. The separator of claim 1 wherein the vertical metal vessel is substantially cylindrical.

3. The separator of claim 1 further comprising a secondary outlet conduit connected through the vessel adjacent the compressible seal means for removing solid particles accumulated at the bottom end of the vertical metal vessel.

4. The separator of claim 1 wherein the lower gas inlet means is disposed to intorduce hot gas into the vertical metal vessel above the central solids collector and below the peripheral gas inlets of the cyclone assemblies.

5. The separator of claim 1 wherein the elongated vertical solids conveying tubes are connected to the centrally disposed solids collector in a radial pattern.

6. The separator of claim 1 wherein the solid, temperature-resistant compressible packing material is fibrous in nature.

7. The separator of claim 1 wherein a particle deflector is located immediately below the top clean gas outlet.

8. The separator of claim 1 wherein the cyclone assemblies are hung from the horizontal support plate in a radially disposed pattern and wherein the solids-conveying tubes are arranged radially around the central solids collector to support said collector in a central position within the vessel to provide uniform thermal expansion.

9. The separator of claims 1 and 8 wherein each of said cyclone assemblies is suspended from the support plate by an upper cyclone support tube gas outlet extending through the diaphragm into an upper plenum chamber, and wherein each of said cyclones has a tangential cyclone inlet disposed to receive particle-laden hot gas from a lower gas receiving zone.

10. The separator of claim 1 wherein the horizontal support plate comprises an essentially circular concavo-convex diaphragm containing a symmetric array of access holes to accommodate the upper cyclone support tube gas outlets in stabilizing relationship.

11. The separator of claims 1 and 10 wherein the horizontal support plate is attached to the vertical metal vessel by means of a cylindrically shaped support enclosure.

12. In a tertiary recovery apparatus for separating finely divided solid particles from a hot gas stream wherein a plurality of spaced-apart cyclones, fully contained in a vertical shell having an upper gas outlet and a lower gas inlet, are operatively connected via downwardly extending dip-legs to a centrally located dip-leg pot, which is, in turn, operatively connected to a main underflow tubular outlet passage for said solid particles extending outwardly from said enclosure vessel, the cyclones being connected at their top outlets to an essentially horizontally extending diaphragm attached to the interior of the shell, the improvement comprising:

an adjustable packing gland structure circumferentially located around the exterior of said main underflow tubular outlet passage forming an axially moving seal between the tubular outlet and the shell.

* * * * *